UNITED STATES PATENT OFFICE.

ANTOINE WARTER AND HENRY C. KOEGEL, OF NEWARK, NEW JERSEY.

ALUM-TANNED SKIN.

SPECIFICATION forming part of Letters Patent No. 381,734, dated April 24, 1888.

Application filed March 23, 1888. Serial No. 268,296. (No specimens.)

*To all whom it may concern:*

Be it known that we, ANTOINE WARTER and HENRY C. KOEGEL, citizens of the United States, residing at Newark, in the county of Essex and State of New Jersey, have invented certain new and useful Improvements in Processes of Tanning Leather; and we do hereby declare that the following is a full, clear, and exact description of our improved process, such as will enable others skilled in the art to which it appertains to make and use the same.

The object of this treatment is to greatly facilitate the process of tanning by largely reducing the time occupied, leaving a salt in the skin which will form a basic mordant for the coloring-matter subsequently used in finishing the skin, and at the same time when the skins are finished leave them perfectly soft, flexible, and water-proof.

The skins are first treated in the usual manner to remove the hair, and are then treated by any of the well-known processes known to the trade to remove the lime, adhering fibrous flesh, and other foreign matter, and in this condition the skins are soft and flexible. We now make a solution consisting of about twelve to fifteen gallons of water, to which has been added about nine pounds of alum, two pounds of chloride of sodium, and thirty pounds of wheat-flour, the whole being thoroughly agitated while subjected to a heat of about 28° or 30° centigrade for about fifteen minutes. We then add about twelve pounds of the yelks of eggs and agitate for an additional five minutes. This mixture is then placed in a suitable revolving drum capable of holding about one hundred pounds of skins, and the whole allowed to revolve for from thirty to sixty minutes, (more or less,) or until the skins have practically absorbed the contents of the drum. This completes the first step in the process, and is what is commonly known as "tawing." They are now removed from the drum and hung up separately to dry. We now make a solution of sal-soda in water of about one pound of soda to a gallon of water, (more or less.) The skins are now placed in this solution until they are thoroughly soft, flexible, and have assumed a neutral condition. The skins are then washed in lukewarm water to remove all foreign matter and traces of soda, and then placed in the following bath. This bath is made by adding sulphuric acid to water until the mixture assumes a density of from 1° to 2° Baumé. We then add to this solution as much of hydrated sesquioxide of chromium or chromic hydrate as it will dissolve, and no harm will be done if there is a surplus of the chromic hydrate remaining in the vessel. Should this solution not be approximately neutral, we make it so by the addition of sal-soda until this result has been accomplished. The skins, having been neutralized, as above mentioned, and afterward washed, are now placed in this solution and the whole agitated for from five to fifteen hours. They are now removed, washed, colored, and finished in the usual manner.

Of course the mordant in the skins when combined with the subsequent coloring-matter permeates the entire fiber of the skin and greatly adds to the lasting qualities of the color and the durability of the skin.

In an application concurrent with this, Serial No. 266,340, we claim a process slightly differing from the process herein described, and which consists in first tanning a skin in a neutral solution of aluminic hydrate dissolved in an acid and subsequently tanned with a neutral solution of hydrated chromium sesquioxide in an acid.

Having thus described our invention, what we claim as new and useful, and desire to secure by Letters Patent of the United States, is—

As a new article of manufacture, a tawed or alum-tanned skin subsequently impregnated with the sesquioxide of chromium, as set forth.

In testimony whereof we hereunto affix our names in the presence of two witnesses.

ANTOINE WARTER.
HENRY C. KOEGEL.

Witnesses:
J. L. LUBIAUX,
H. J. ENNIS.